United States Patent
Ohshima (10) Patent No.: US 7,002,309 B2
(45) Date of Patent: Feb. 21, 2006

(54) POWER WINDOW DRIVING APPARATUS

(75) Inventor: Shunzou Ohshima, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/965,823

(22) Filed: Oct. 18, 2004

(65) Prior Publication Data

US 2005/0116672 A1 Jun. 2, 2005

(30) Foreign Application Priority Data

Oct. 16, 2003 (JP) ........................ P. 2003-356196

(51) Int. Cl.
*H02P 1/00* (2006.01)
(52) U.S. Cl. .................. 318/286; 318/468; 318/466
(58) Field of Classification Search ................ 318/286, 318/282, 468, 466; 307/10
See application file for complete search history.

(56) References Cited

U.S. PATENT DOCUMENTS 4,780,619 A * 10/1988 Campbell et al. .......... 307/10.1
2003/0160510 A1 * 8/2003 Mizutani et al. ........... 307/10.1

FOREIGN PATENT DOCUMENTS

| JP | 10-25964 A | 1/1998 |
| JP | 2002-89132 A | 3/2002 |
| JP | 2002-96632 A | 4/2002 |
| JP | 2002-295129 A | 10/2002 |

* cited by examiner

*Primary Examiner*—Karen Masih
(74) *Attorney, Agent, or Firm*—Sughrue Mion, PLLC (57) ABSTRACT

A power window driving apparatus includes a reference current generator generating a reference current. The reference current generator includes a first current generator generating a first current, a first comparison signal, and a second comparison signal, a reference voltage generator generating a reference voltage signal, and a second current generator generating a second current. The power window driving apparatus includes a comparator which includes the first comparison signal with the reference voltage signal, a driving controller which stops or reverses the driving motor when a drastic increase is occur in the motor current based on a result of a comparison by the comparator, and a current increaser which increases an amount of the second current when the motor current is drastically decreased from a steady state, so that an increase in the first current is suppressed when the motor current is shifted from the drastically decrease to an increase.

9 Claims, 3 Drawing Sheets

POWER WINDOW DRIVING APPARATUS

BACKGROUND OF THE INVENTION

The present invention relates to a power window driving apparatus for controlling a power window installed in a vehicle, and more particularly to a technique for preventing an erroneous reversal of the power window when running on a rough and bumpy road.

A power window glass of a power window installed in the vehicle is connected to a driving motor and is operated to be raised or lowered by rotating reversibly the driving motor through operation of a switch. In addition, there has been proposed and put into practical use a power window having a function to prevent a damage to an obstacle and/or a power window glass itself that would be caused in the event that the obstacle is seized by the power window while it is being raised by stopping and then reversing the driving motor so as to lower the power window glass.

As a related power window driving apparatus, there has been known a technique for avoiding an impact caused by the seizure of an obstacle by the power window glass by stopping and reversing the driving motor when the value of a current flowing to the driving motor exceeds a predetermined value, whereby the driving motor is put in an excess load condition (see JP-A-10-25964 (FIG. 1), for example).

In the related power window driving apparatus described above, however, in the event that there occurs a variation in current which flows to the driving motor, irrespective of the fact that no seizure of obstacle by the power window glass occurs, it is determined that a seizure of an obstacle has occurred, and therefore, an erroneous operation is caused in which the power window is stopped and then is reversed.

This erroneous operation of the power window occurs very often when the vehicle is driven on rough roads and causes a problem that when running on a rough road, in the event that the window glass is raised, the driving force of the window glass is caused to vary due to vibrations (vertical vibrations) of the vehicle body, and due to this, the current flowing to the driving motor is caused to vary. As a result, there is caused a problem that the occurrence of a seizure of an obstacle by the power window is erroneously determined, whereby the power window is operated reversely.

SUMMARY OF THE INVENTION

The invention was made with a view to solving the problem, and an object thereof is to provide a power window driving apparatus which does not generate an erroneous operation even in the event that the vehicle is running on a rough road and which ensures the detection of seizure of an obstacle by the power window glass in the event that the seizure occurs actually.

With a view to attaining the object, according to a first aspect of the invention, there is provided a power window driving apparatus, comprising:

a reference current generator, which generates a reference current (Ir) having a level corresponding to a motor current (ID) which flows to a power window driving motor, the reference current generator including:

a first current generator, which generates a first current (Ir1) having a level corresponding to a variation level of the motor current, a first comparison signal (Vins) converted from the first current, and a second comparison signal (Vc2) also converted from the first current;

a reference voltage generator, which generates a reference voltage signal (Vc) based on a time mean value of the second comparison signal (Vc2); and a second current generator, which generates a second current (Ir3) which has a level corresponding to the reference voltage signal (Vc), and the second current being equal in level to the reference current (Ir) when added to the first current;

a comparator (CMP1), which compares the first comparison signal (Vins) with the reference voltage signal (Vc);

a driving controller, which stops or reverses the driving motor when it is determined that a drastic increase is occur in the motor current based on a result of a comparison by the comparator; and a current increaser, which increases an amount of the second current (Ir3) for a predetermined period when the motor current (ID) is drastically decreased from a steady state, so that an increase in the first current is suppressed when the motor current is shifted from the drastically decrease to an increase.

According to a second aspect of the invention, there is provided a power window driving apparatus as set forth in the first aspect of the invention, further comprising a determinant, which determines that the motor current (ID) is drastically decreased from a steady state when a state where the second comparison signal (Vc2) is equal to or greater than the reference voltage signal (Vc) continues over a first predetermined time.

According to a third aspect of the invention, there is provided a power window driving apparatus as set forth in the first aspect of the invention, wherein the current increaser includes a first capacitor (C13);

wherein the reference voltage signal (Vc) is input to one end of the first capacitor (C13); and wherein when it is determined that the motor current (ID) is drastically decreased from a steady state, the other end of the first capacitor (C13) is grounded so that the first capacitor is charged by the reference voltage signal (Vc), whereby the reference voltage signal (Vc) is decreased for a predetermined period so as to increase the second current (Ir3).

According to a fourth aspect of the invention, there is provided a power window driving apparatus as set forth in the third aspect of the invention, wherein when the second comparison signal (Vc2) becomes smaller than the reference voltage signal (Vc), the grounding of the first capacitor (C13) is released so that an electric potential (Vrr) on a grounded side of the first capacitor gradually increases toward a supply voltage (VB2).

According to a fifth aspect of the invention, there is provided a power window driving apparatus as set forth in the third aspect of the invention, further comprising a second capacitor (C11) which has one end to which the reference voltage signal (Vc) is input, wherein the grounded side electric potential (Vrr) of the first capacitor resides at a grounded electric potential or between the grounded electric potential and the supply voltage; and wherein when the comparator (CMP1) detects that the first comparison signal (Vins) becomes smaller than the reference voltage signal (Vc), the other end of the second capacitor (C11) is grounded so that the the second capacitor is charged by the reference voltage signal (Vc), whereby the reference voltage signal (Vc) is decreased, whereas the second current (Ir3) is increased, as a result of which the decrease of the first current (Ir1) is accelerated so that the time period when the first comparison signal (Vins) remains smaller than the reference voltage signal (Vc) is reduced.

According to a sixth aspect of the invention, there is provided a power window driving apparatus as set forth in the fifth aspect of the invention, further comprising a circuit having a first semiconductor element (T201) and a second semiconductor element (T203) which are connected in series, the circuit being provided between the other end of the second capacitor (C11) and the ground, wherein the grounded side electric potential (Vrr) of the first capacitor is input to a control terminal of the first semiconductor element (T201) and an inverted output of the comparator (CMP1) is input to a control terminal of the second semiconductor element (T203);

wherein the first semiconductor element (T201) is energized when the grounded side electric potential (Vrr) of the first capacitor resides at the grounded electric potential or between the grounded electric potential and the supply voltage (VB2); and wherein the second semiconductor element (T203) is energized when the first comparison signal (Vins) is smaller than the reference voltage signal (Vc), whereby the other end of the second semiconductor element (T203) is grounded.

According to a seventh aspect of the invention, there is provided a power window driving apparatus as set forth in the fifth aspect of the invention, wherein a discharging time constant of the second capacitor is set to a value that is not discharged completely when the second capacitor (C11) is repeatedly grounded within a short period of time; and wherein when the second capacitor is repeatedly grounded within the short period of time, electric charge is accumulated in the second capacitor, and charge current decreases as the number of times of repetition increases, thereby the effect of decreasing the reference voltage (Vc) is reduced gradually.

According to an eighth aspect of the invention, there is provided a power window driving apparatus as set forth in the second aspect of the invention, wherein when the determinant determines the drastic decrease from the steady state of the motor current (ID), the first predetermined time is set to become shorter as the motor current (ID) becomes greater.

According to a ninth aspect of the invention, there is provided a power window driving apparatus as set forth in the eighth aspect of the invention, further comprising a third semiconductor element (T202) being an NMOS, wherein a drain of the third semiconductor element is connected to the first capacitor (C13), a source of the third semiconductor element is grounded, and the result of the determination that the motor current (ID) is drastically decreased from the steady state is input into a gate of the third semiconductor element as voltage; and wherein a bias voltage which increases as the motor current (ID) increases is superimposed on a gate voltage of the third semiconductor element (T202) so that the first predetermined time is set to become shorter as the motor current (ID) becomes greater.

According to the power window driving apparatus set forth in the first aspect of the invention, when the motor current ID drastically decreases from the steady state, it is determined that the vehicle is running on the rough road, and when the motor current is shifted to increase thereafter, the increase in the current Ir1 is suppressed by increasing the current Ir3 intentionally, so that the first comparison signal voltage Vins does not become lower than the reference voltage signal Vc. As a result, the problem can be avoided that the output signal of the comparator CMP1 is reversed irrespective of the fact that there is occurring no seizure of an obstacle by the power window glass, thereby making it possible to prevent the occurrence of an erroneous halt or reversal of the driving motor M1.

In addition, according to the second aspect of the invention, the reference voltage signal Vc changes so as to be converged on the mean value of the second comparison signal Vc2 which pulsates, and since it is determined that the motor current ID has drastically decreased, in the event that the state where the second comparison signal Vc2 is larger than the reference voltage signal Vc continues longer (in the event that the state continues to exceed the first predetermined time), the rough road running can be determined in an ensured fashion.

Furthermore, according to the third aspect of the invention, since, in the event that the motor current decreases drastically, the reference voltage signal Vc is decreased, whereas the second current Ir3 is increased by allowing the charge current of the first capacitor C13 to flow from a point where the reference voltage signal Vc is generated, as a result of which the first current Ir1 is decreased, the decrease of the first comparison signal Vins based on the rough road running can be suppressed, thereby making it possible to prevent the occurrence of an erroneous halt or reversal of the driving motor.

In addition, according to the fourth aspect of the invention, when the rough road running is finished and the second comparison signal Vc2 becomes smaller than the reference voltage signal Vc, since the voltage Vrr increases gradually from the grounded electric potential toward the supply voltage, even in the event that the degree (intensity) of the rough road varies, causing a time period when the degree of the rough road becomes moderate (less intense), the erroneous reversal prevention effect can continue for the time period.

Furthermore, according to the fifth and sixth aspects of the invention, since the reference voltage signal Vc is decreased, whereas the second current Ir3 is increased by allowing the charge current to flow to the second capacitor C11, when the comparator CMP1 detects that the first comparison signal Vins becomes smaller than the reference voltage signal Vc in the event that the voltage Vrr resides between the grounded electric potential and the supply voltage, in other words, in the event that it is determined that the rough road running is performed, the time period can be reduced when the first comparison signal Vins becomes smaller than the reference voltage signal Vc. Consequently, even in the event that the first comparison signal Vins becomes lower than the reference voltage signal Vc while running on the rough road, the occurrence of an erroneous halt or reversal of the driving motor can be prevented.

According to the seventh aspect of the invention, since the discharging time constant of the second capacitor C11 is set to the large value, when the one end of the second capacitor C11 is grounded repeatedly, the charge current decreases gradually, and hence the effect of decreasing the reference voltage signal Vc decreases. Thus, in the event that an obstacle is seized by the power window while running on the rough road, the seizure is detected in an ensured fashion, thereby making it possible to stop or reverse the driving motor.

According to the eighth and ninth aspects of the invention, since, when the reference voltage signal Vc decreases as the motor current increases, the bias current I5 flows to thereby increase the gate voltage of the third semiconductor element T202, the first predetermined time used for determining the rough road running becomes shorter, whereby the output signal of the comparator CMP1 is made difficult to be reversed. As a result, even in the event that the operation resistance of the window glass becomes large due to the friction of rubber resulting from, for example, a low ambient temperature, an erroneous operation can be prevented in which the driving motor is stopped due to the increase in current in association with the increase in operation resistance of the widow glass.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
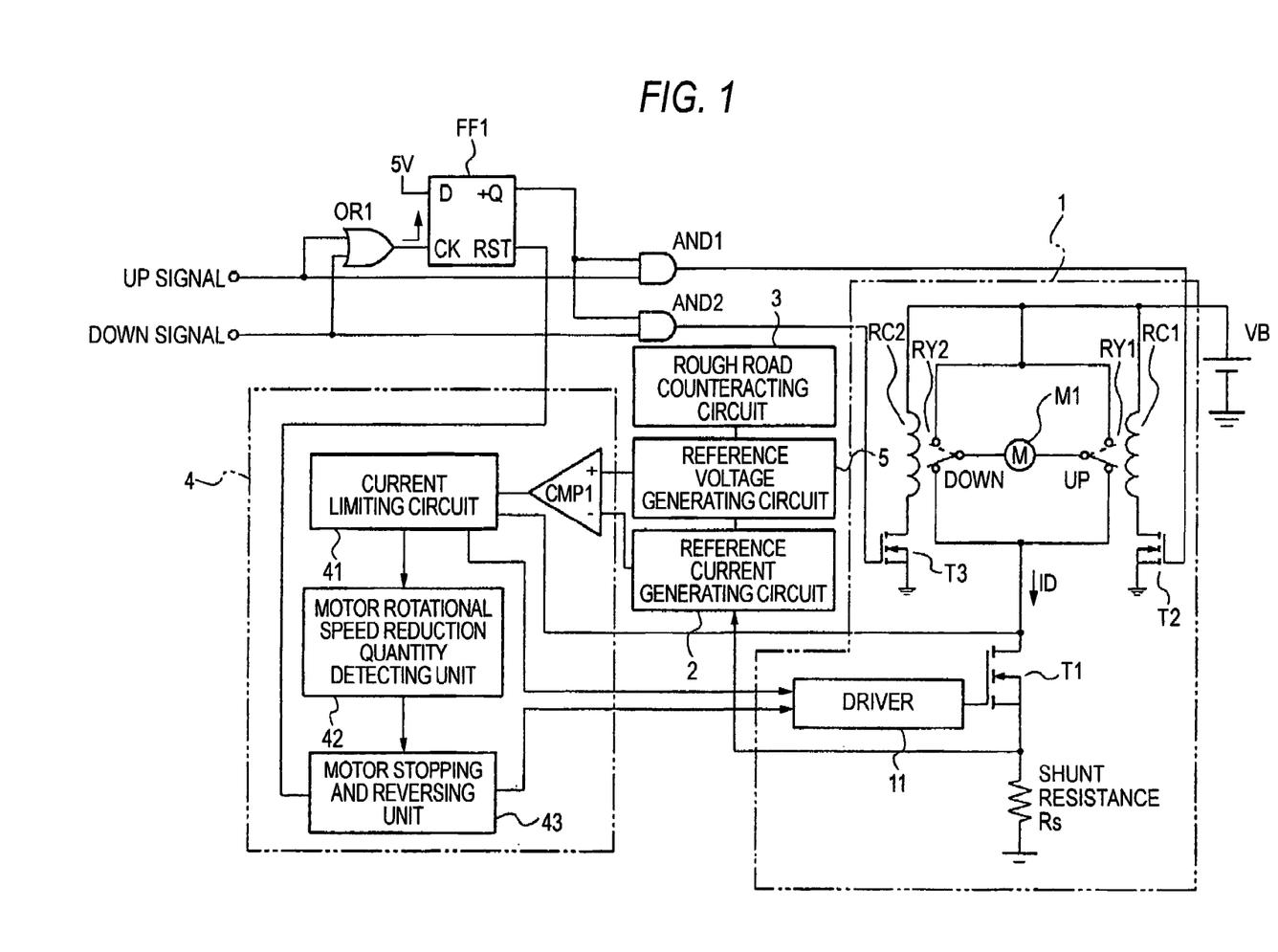
FIG. 1 is a block diagram showing the configuration of a power window driving apparatus according to an embodiment of the invention.

Hereinafter, an embodiment of the invention will be described based on the drawings. FIG. 1 is a block diagram showing the configuration of a power window driving apparatus according to an embodiment of the invention.

As shown in FIG. 1, the power window driving apparatus has a motor driving circuit 1 for controlling a driving motor M1 for driving a power window installed in a vehicle, a reference voltage generating circuit (a reference voltage generator) 5 for determining a seizure of an obstacle by the power window while the power window is being driven, a reference current generating circuit (a reference current generator) 2 for generating a current which is proportional to a current flowing to the driving motor M1, a rough road counteracting circuit 3 for detecting a rough road driving of the vehicle when it actually happens and outputting a rough road mode signal, and a driving control circuit (a driving controller) 4 for generating a signal for controlling the driving of the driving motor M1 based on a value of the current flowing to the driving motor M1 and a change in current.

Furthermore, the power window driving apparatus includes two AND circuits AND1, AND2, an OR circuit OR1, and a flip-flop circuit FF1.

The driving motor M1 includes relays RY1, RY2 for rotating the driving motor M1 reversibly. Furthermore, an FET (T1) is provided downstream of the relays as a device for controlling the current flowing to the driving motor M1, and a shunt resistance Rs is provided between the FET (T1) and a ground.

In addition, the driving motor M1 is connected to a power supply VB on an upper stream side, and the power supply VB is connected to the ground via a relay coil Rc1 and an FET (T2), and is connected to the ground via a relay coil Rc2 and an FET (T3).

A gate of the FET (T2) is connected to an output terminal of the AND circuit AND1, and an UP signal is input into an input terminal of the AND circuit AND1. Thus, when an UP operation signal is input, the relay coil Rc1 is energized, and a contact of the relay RY1 is connected to an upper side, whereby the current flows to the driving motor M1 from a right side to a left side in the drawing. Then, the driving motor M1 rotates in a raising direction so as to raise the window glass.

Furthermore, a gate of the FET (T3) is connected to an output terminal of the AND circuit AND2 and a DOWN signal is input into an input terminal of the AND circuit AND2. Thus, when a DOWN operation signal is input, the relay coil Rc2 is energized, and a contact of the relay RY2 is connected to an upper side, whereby the current flows to the driving motor M1 from the left side to the right side in the drawing. Then, the driving motor M1 rotates in a lowering direction so as to lower the window glass.

In addition, a gate of the FET (T1) is connected to a driver circuit 11, and On and Off are changed over by controlling the driver circuit 11.

The driving control circuit 4 includes the comparator CMP1 (the comparator) for comparing a reference voltage generated at the reference voltage generating circuit 5 with the voltage of a comparison signal obtained from a current value generated at the reference current generating circuit, a current limiting circuit 41 for controlling the limiting of the current flowing to the driving motor M1 based on the result of the comparison implemented by the comparator CMP1, a motor rotational speed reduction detecting unit 42 for detecting a reduction in the rotational speed of the driving motor M1, and a motor stopping and reversing unit 43 for controlling the stopping and reversing of the driving motor M1.

Figure 2:
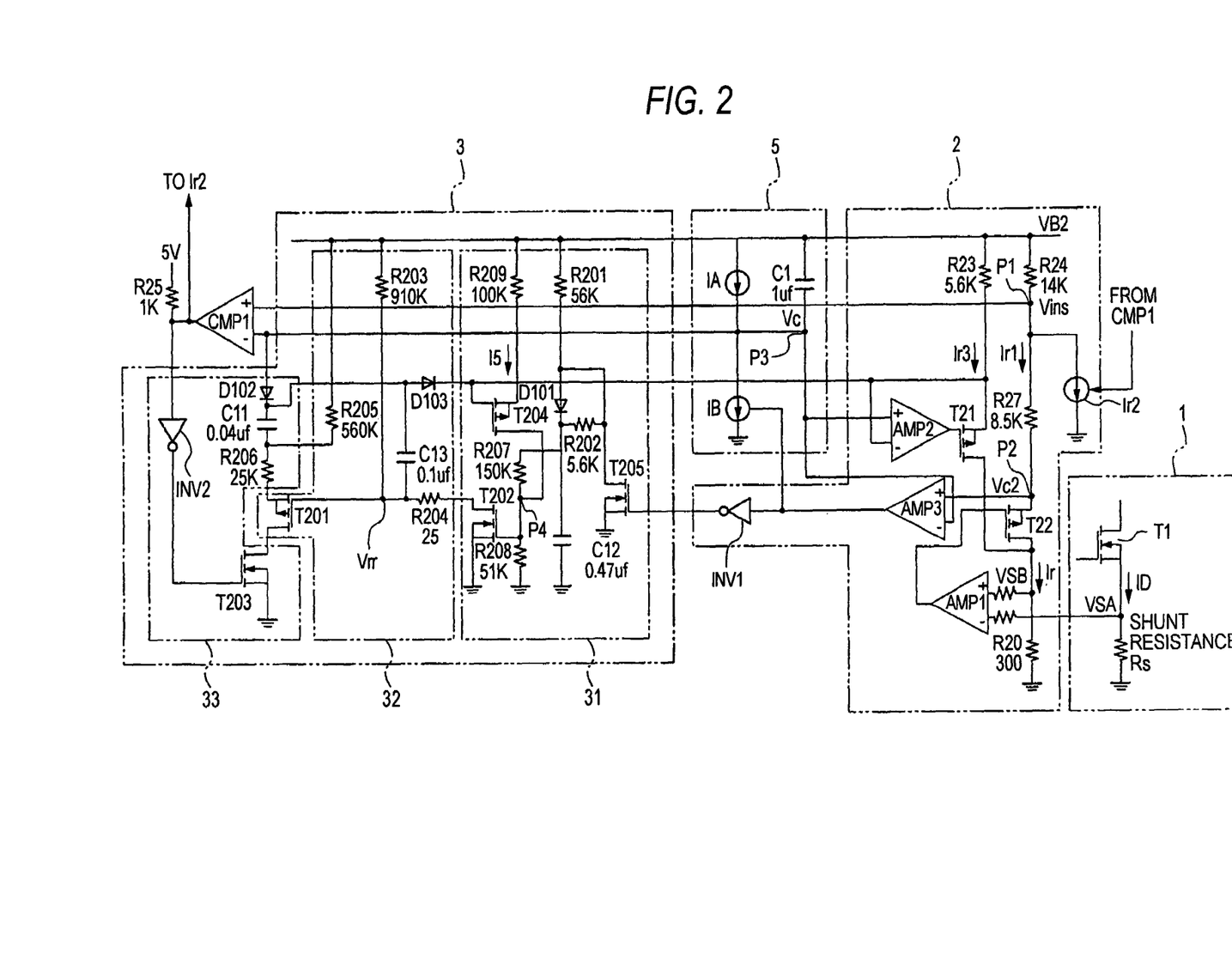
FIG. 2 is a circuit diagram illustrating specifically the configuration of the power window driving apparatus according to the embodiment of the invention.

FIG. 2 is a circuit diagram illustrating more specifically the power window driving apparatus shown in FIG. 1. Note that in the drawing, a portion downstream of the comparator CMP1 and a portion upstream of the gate of the FET (T1) in the driving control circuit 4 are omitted.

As shown in FIG. 2, the reference current generating circuit 2 has a circuit in which resistances R24, R27, an FET (T22) and a resistance R20 are connected in series. Furthermore, a circuit in which a resistance R23 and an FET (T21) are connected in series is disposed in parallel with the circuit in which the resistances R24, R27 and the FET (T22) are connected in series. Here, the circuit configured by the resistances R24, R27 and the FET (T22) constitutes a first current generator, and a current flowing to this circuit is made to constitute Ir1 (a first current). In addition, the circuit configured by the resistance R23 and the FET (T21) constitutes a second current generator, and current flowing to the circuit is made to constitute Ir3 (a second current). Then, a sum of Ir1 and Ir3 (Ir1+Ir3) constitutes a reference current Ir. In addition, in FIG. 2, numerical values given under reference numerals denoting circuit elements denote amounts of the circuit elements. For example, the resistance value of the resistance R24 is 14 KΩ.

In addition, the reference current generating circuit 2 has an amplifier AMP1, and a negative side terminal of the amplifier AMP1 is connected to a connecting point between the shunt resistance Rs and the FET (T1) via a resistance. The voltage of this point is regarded as VSA. Furthermore, a positive side input terminal of the same amplifier is connected to a drain of the FET (T22) via a resistance. The voltage of this point is regarded as VSB. In addition, an output terminal of the amplifier AMP1 is connected to a gate of the FET (T22).

Furthermore, the reference current generating circuit 2 has amplifiers AMP2, AMP3. An output terminal of the amplifier AMP2 is connected to a gate of the FET (T21), and a negative side input terminal thereof is connected to a source of the FET (T21). In addition, a positive side input terminal of the same amplifier is connected to a negative side input terminal of the amplifier AMP3, and a positive side input terminal of the amplifier AMP3 is connected to a source of the FET (T22). The output terminal of the amplifier AMP3 is connected to an inverter INV1.

In addition, a connecting point P1 between the resistances R24 and R27 is connected to a positive side input terminal of the comparator CMP1. The voltage of the connecting point P1 is regarded as a comparison voltage Vins (a first comparison signal).

The reference voltage generating circuit 5 includes two current sources IA, IB which are connected to each other in series, and the current source IB is designed to output a current two times larger than a current output by the current source IA. Namely, IB=2*IA. In addition, the current source IA is set to output a current at all times, and the current source IB is set to allow a current to flow when the voltage of the output terminal of the amplifier AMP3 is "L".

Furthermore, a connecting point P3 between the current source IA and the current source IB is connected to a power supply VB2 via a capacitor C1 and is connected the positive side input terminal of the amplifier AMP2 and the negative side input terminal of the amplifier AMP3. Additionally, the connecting point P3 is connected to the negative side input terminal of the comparator CMP1. Here, the power supply VB2 is a control voltage derived from the power supply VB shown in FIG. 1.

In addition, the point P1 is connected to the ground via a current source Ir2, and when the output signal of the comparator CMP1 is at an "L" level, the current source Ir2 becomes on so as to allow a current to flow.

The rough road counteracting circuit 3 includes a trigger circuit 31, a rough road mode circuit 32 and a bucket circuit 33. Here, the bucket circuit 33 is, as will be described later on, a circuit for drawing out electric charge from the capacitor C1 having a large capacity for filling a capacitor having a small capacity with the electric charge so drawn out. In other words, the bucket circuit is intended to perform an action of drawing water from a reservoir, which is the capacitor C1, using a bucket, which is the capacitor 11.

The trigger circuit 31 determines whether or not the vehicle is currently running on a rough road based on the magnitude of or variation in the current value (load current) which flows to the driving motor M1. The trigger circuit 31 has a circuit in which a resistance R201, a diode D101 and a capacitor C12 are connected to in series, and an end of this series connected circuit is connected to the power supply VB2, and the other end thereof is connected to the ground.

In addition, a connecting point of the diode D101 and the resistance R201 is connected to a drain of an FET (T205), and a connecting point of the diode D101 and the capacitor C12 is also connected to the drain of the FET (T205) via a resistance R202.

A source of the FET (T205) is grounded and a gate thereof is connected to an output terminal of the inverter INV1. Consequently, the amplifier AMP3 operates such that when the output signal of the amplifier AMP3 is "L", the FET (T205) becomes on, whereas when the output signal of the same amplifier is "H", the same FET becomes off.

The connecting point of the diode D101 and the capacitor C12 is connected to the ground via resistances R207, R208, and connecting points of the respective resistances R207, R208 are connected to a gate of an FET (T202; a third semiconductor element) and a drain of an FET (T204).

A gate of the FET (T204) is connected to the source of the FET (T21). In addition, a source of the FET (T204) is connected to the power supply VB2 via a resistance R209.

The rough road mode circuit 32 includes an FET (T201; a first semiconductor element), resistances R203, R204, R205, a capacitor C13 (a first capacitor) and a diode D103.

A gate of the FET (T201) is connected to a drain of the FET (T202) via the resistance R204 and to the power supply VB2 via the resistance R203 and is further connected to the source of the FET (T21) via the capacitor C13 and the diode D103. Here, the voltage of the gate of the FET (T201) is regarded as Vrr.

The bucket circuit 33 includes an inverter IV2, the FET (T203; a second semiconductor element) and a diode D102, the capacitor C11 and a resistance R206.

A source of the FET (T203) is grounded, and a drain thereof is connected to a drain of the FET (T201). In addition, a gate of the FET (T203) is connected to the output terminal of the comparator CMP1 via the inverter IV2 and is connected further to a power supply of 5 volts via a resistance R25.

Additionally, a source of the FET (T201) is connected to a negative side terminal (P3) of the capacitor C1 of the reference voltage generating circuit 5 via the resistance R206, the capacitor C11 (the second capacitor) and the diode D102. A connecting point of the capacitor C11 and the resistance R206 is connected to the power supply VB2 via the resistance R205, and a connecting point of the capacitor C11 and the diode D102 is connected to a connecting point of the diode D103 and the capacitor C13.

Next, the operation of the power window driving apparatus according to the embodiment which is constructed as has been described heretofore will be described.

Firstly, when an UP signal is input by the operator in order to raise the window glass, the FET(T1) is switched on by the driver 11 as shown in FIG. 1. Furthermore, the output signal of the AND circuit AND1 becomes "H", and the relay coil Rc1 is energized. Thus, the contact of the relay RY1 is connected to the upper side, and the current flows to the driving motor M1 from the right side to the left side in the drawing, whereby the driving motor M1 rotates in the raising direction so as to raise the window glass.

On the contrary to this, when a DOWN signal is input, the output signal of the AND circuit AND2 becomes "H", and the relay coil Rc2 is energized. Thus, the contact of the relay RY2 is connected to the upper side, and the current flows to the driving motor M1 from the left side to the right side in the drawing, whereby the driving motor M1 rotates in the lowering direction so as to lower the window glass.

When the driving motor M1 is being driven, a load current ID flows to the FET (T1), as shown in FIG. 2. Then, the voltage VSA and the voltage VSB are controlled so as to become equal by the amplifier AMP1 and the FET (T22). Consequently, assuming that a current flowing to the resistance R20 is Ir (reference current), the reference current Ir is controlled so as to have a magnitude which is proportional to the load current ID (a ratio determined by the shunt resistance Rs and the resistance R20).

In addition, the reference voltage Vc is set such that the comparison voltage Vins generated at the point P1 becomes slightly larger than the reference voltage Vc generated at the point P3, as will be described later on, when the driving motor is being driven. Namely, in a steady state, the output signal of the comparator CMP1 has already been "H".

The reference voltage Vc generated at the point P3 is generated by charging and discharging the capacitor C1 with current output from the current sources IA and IB. The current source IA is energized at all times. In addition, the current source IB is energized only when the output signal of the amplifier AMP3 is "L", and the same current source becomes off when the same output signal is "H".

Namely, when the output signal of the amplifier AMP3 is "H", the current source IB becomes off, and therefore, the capacitor C1 is charged by the current source IA. On the contrary, when the output signal of the amplifier AMP3 is "L", the current source IB becomes on, and therefore, since IB=2*IA as has been described before, a current of (IB-IA) =IA is allowed to flow, whereby the capacitor C1 is discharged (current flows out from the point P3).

A pulsation component is included in the load current ID flowing to the driving motor M1. This is because a current variation corresponding to the number of segments is generated through a single rotation of the motor by a relative position change between a commutator segment and a brush. The pulsation component is also included in the reference current ir equally. Here, the current Ir3 is controlled by Vc with a relationship of Ir3=(VB2-Vc)/R23. Since the reference voltage Vc cannot change drastically, the current Ir3 cannot follow the pulsation component.

Consequently, the pulsation component included in the reference current Ir is all included in the current Ir1. Consequently, assuming that the voltage at the point P2 is Vc2 (the second comparison signal), a voltage variation in synchronism with the pulsation component is generated in the voltage Vc2. The load current ID also varies due to a load variation. A variation in motor current due to the pulsation component and the load variation all appears in the voltage Vc2.

When the voltage Vc2 is larger than the reference voltage Vc, the output from the amplifier AMP3 becomes "H", and the current source IB is not energized. Therefore, the capacitor C1 is charged. On the contrary, when the voltage Vc2 is smaller than the reference voltage Vc, the output from the amplifier AMP3 becomes "L", and the capacitor C1 is discharged.

In addition, when there occurs no load variation in the driving motor M1, the electric potential variation in the voltage Vc2 becomes only such a variation that is caused by the pulsation component, and the mean value of the voltage Vc2 becomes substantially constant. As this occurs, the reference voltage Vc becomes stable where the ratio of a time when Vc2>Vc is realized becomes equal to the ratio of a time when Vc2<Vc is realized.

Figure 3A:
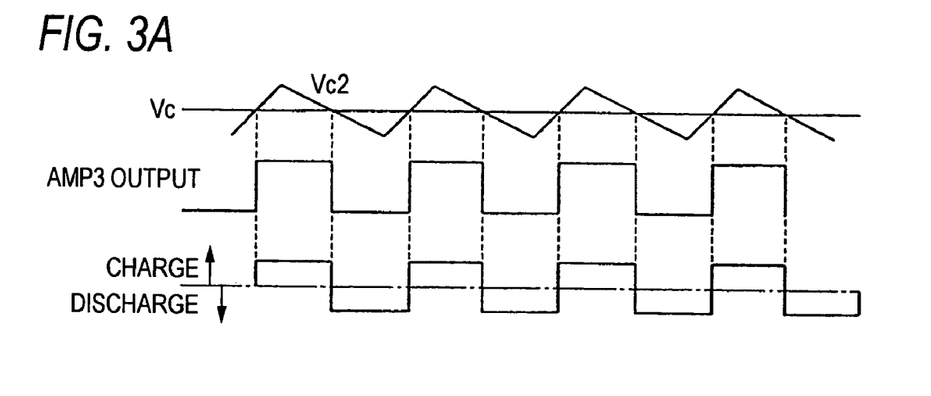
FIG. 3A is a characteristic chart illustrating how a voltage Vc2 changes, as well as how a reference voltage Vc changes in association with the change of the voltage Vc2.
Figure 3B:
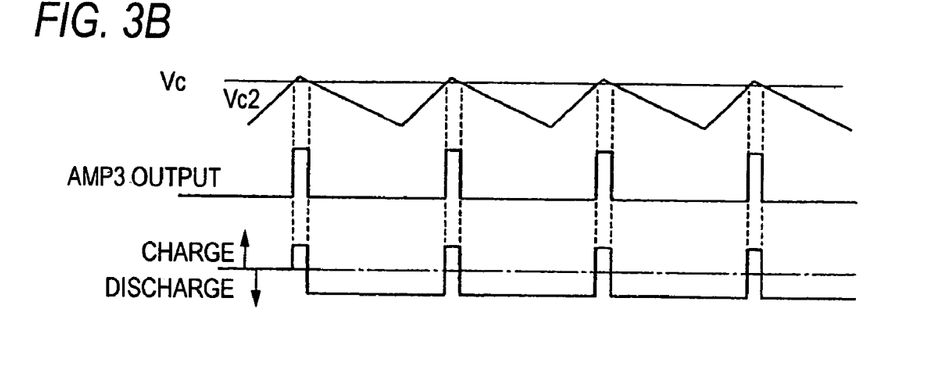
FIG. 3B is a characteristic chart illustrating how the voltage Vc2 changes, as well as how the reference voltage Vc changes in association with the change of the voltage Vc2.

This state is shown in FIG. 3A. Next, as shown in FIG. 3B, when the load of the driving motor M1 increases and the load current ID increases, the voltage Vc2 decreases. Then, the position of the voltage Vc2 is lowered relative to the reference Voltage Vc, and the discharge time of the capacitor C1 becomes longer than the charge time thereof, and the reference voltage Vc also decreases.

Figure 3C:
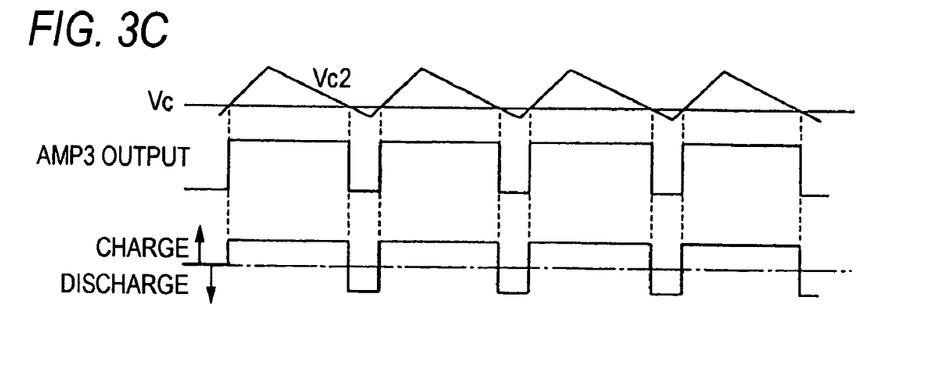
FIG. 3C is a characteristic chart illustrating how the voltage Vc2 changes, as well as how the reference voltage Vc changes in association with the change of the voltage Vc2.

In addition, as shown in FIG. 3C, when the load of the driving motor M1 decreases, the load current ID decreases, and the voltage Vc2 increases. Due to this, since the voltage Vc2 becomes larger than the reference voltage Vc, the charge time of the capacitor C1 becomes longer than the discharge time thereof, and the reference voltage Vc also increases.

Namely, since the reference voltage Vc is controlled so as to be converged on the time mean value of the voltage Vc2, when the voltage Vc2 changes, the reference voltage Vc follows the change. The following speed is determined by the magnitude of the charge and discharge current values IA, IB, and when IA, IB increase, the following properties are improved.

When the voltage Vc2 changes moderately, a difference between the reference voltage Vc and the time mean value of the voltage Vc2 becomes small, and when there exists no change, the reference voltage Vc and the time mean value of the voltage Vc2 coincide with each other. When an obstacle is seized by the power window, while the voltage Vc2 decreases drastically, the charge and discharge current values IA, IB are set such that the reference voltage Vc cannot follow the decreasing speed then.

The detection of such a seizure is implemented by comparing the voltage Vins resulting when the voltage (VB2-Vc2) is divided between the resistances R24 and R27 with the reference voltage Vc.

$$Vins = (VB - Vc2) * R27 / (R24 + R27) + Vc2$$
$$= (VB2 * R27 + Vc2 * R24) / (R24 + R27) > Vc2$$

When the reference voltage Vc follows the voltage Vc2, Vins>Vc is realized since the reference voltage Vc is substantially equal to the time mean value of the voltage Vc2. Since the voltage Vins and the reference voltage Vc are supplied to the positive side input terminal and the negative side input terminal of the comparator CMP1, respectively, the output signal of the comparator CMP1 becomes "H". When the seizure of an obstacle occurs, the voltage Vc2 decreases, and the voltage Vins decreases. Since the reference voltage Vc cannot decrease immediately, Vins<Vc is realized, and the output signal of the comparator CMP1 becomes "L", and the current limiting operation is started.

Namely, a control signal is output to the driver 11 by controlling the current limiting circuit 41, the motor rotational speed reduction detecting unit 42 and the motor stopping and reversing unit 43 in the driving control circuit 4 shown in FIG. 1, and the FET (T1) is switched off, whereby the rising of the window glass is stopped. Furthermore, by reversing the driving motor M1, the window glass is lowered.

To explain specifically, in the event that the output signal of the comparator CMP1 becomes "L", the FET (T1) is operated so as to be on and off in order to decrease the load current ID by a certain quantity. When the load current decreases by the certain quantity through the on/off operation of the FET(T1), the output of the comparator CMP1 becomes "H", and the FET (T1) is restored to the On state, whereby the FET (T1) maintains the On state until the load current ID increases by the certain quantity. Namely, in the event that the current increases drastically, the load current is limited within a certain range (a limiting range in ID) by alternately repeating the on/off operation and the continuous On state.

When the obstacle seizure actually occurs and the motor rotational speed decreases, since the load current required by the motor increases gradually, the continuing time of the on/off operation needed to decrease the current by the certain quantity in ID and hence the number of times of repetition increases, and on the contrary, the time of the continuous On state decreases. When the number of times of repetition of the on/off operation exceeds a predetermined value, the occurrence of obstacle seizure is determined, and the motor is cut off so as to start a reversal operation.

The current limiting range ID in the current limiting operation is determined by the current value of the current source Ir2. While performing the on/off operation, that is, while the output of the comparator CMP1 remains "L", the current Ir2 flows, and the current flowing through the resistance R24 increases by that extent, the comparison voltage Vins decreasing further. When the load current decreases through the on/off operation, Vins increases and the output of the comparator CMP1 is reversed from "L" to "H", the current Ir2 is cut off, the voltage drop at the resistance R24 decreases by that extent, and therefore, Vins increases further. The current Ir2 allows a hysteresis to be given to the operation of the comparator CMP1, whereby the current limiting operation is realized.

Next, the idea will be described of the prevention of erroneous stopping of the driving motor M1 while running on the rough road, that is, the prevention of stopping of the driving motor M1 from the erroneous recognition of the occurrence of obstacle seizure.

When the vehicle runs on a rough road, the driving force of the window glass varies. When the driving load increase, the load current ID increases, and the voltage Vc2 at the point P2 decreases. In the event that the decreasing speed of the voltage Vc2 is fast and the decrease continues, the current limiting operation is started, and this may lead to an erroneous stopping of the driving motor M1. Here, the characteristics of the load variation due to the rough road running is that increase and decrease are generated alternately. The increase and decrease in the load variation appears as the increase and decrease in Ir1.

A factor for decreasing the voltage Vc2 is an increase in the current Ir1. Here, since the reference current Ir is Ir=Ir1+Ir3, in the event that the current Ir3 is caused to increase relative to the same reference current Ir intentionally, the current Ir1 can be caused to decrease relatively. In this embodiment, when the current Ir1 decreases as a result of the rough road running, the increase in current Ir1 that will occur next time ID increases (an increase that is generated as a reaction to the decrease in ID) is suppressed by increasing the current Ir3 intentionally, so that the erroneous stopping of the FET (T1) is prevented. In order to increase the current Ir3, the reference voltage Vc is caused to decrease artificially. As a result of this, an interval between the voltage Vins as the comparison signal and the reference voltage Vc is expanded.

Next, the operation of the rough road counteracting circuit 3 will be described.

As has been described above, the output signal of the amplifier AMP3 becomes a signal whose duty ratio of "H" and "L" becomes about 50% due to the effect of the pulsation component contained in the load current at normal times (in a state where no rough road running or no obstacle seizure occurs). Consequently, the output signal of the inverter INV1, which results by reversing the signal of the comparator CMP1, becomes a pulse signal whose duty ratio is about 50%.

Then, the output signal of the inverter INV1 is "L", the FET (T205) becomes off, and the capacitor C12 is charged via the resistance R201 and the diode D101.

On the other hand, when the output signal of the inverter INV1 is "H", since the FET (T205) becomes on, the capacitor C12 is discharged. Then, the charging time constant is determined by a product R201*C12 of the resistance R201 and the capacitor C12, and the discharging time constant is determined by a product R202*C12 of the resistance R202 and the capacitor C12. In the event that these time constants are set properly, that is, are set to realize R201=R202, a voltage proportional to the "H" duty of the output of the amplifier AMP3 is generated at the positive side terminal of the capacitor C12. In addition, as shown in FIG. 2, in the event that the resistance R201 is set to be larger than the resistance R202, or, to be specifically, in the event that the resistance R201 is set to 56[KΩ] and the resistance R202 to 5.6[KΩ], a longer time is needed for charging when compared with one for discharging, and the positive side terminal voltage of the capacitor C12 which corresponds to the "H" duty of the output of the amplifier AMP3 takes a lower value when compared with the case where the charging and discharging constants are equal.

Consequently, when the time when the voltage Vc2 is larger than the reference voltage Vc (the time when the voltage Vc2 does not become smaller than the reference voltage Vc) is longer, the duty ratio of the output signal of the amplifier AMP3 becomes larger than 50%. Namely, the time "H" becomes longer. Consequently, the output signal of the inverter INV1 has a longer "L" time, and the capacitor C12 is operated so as to be charged.

When the capacitor C12 is charged, since the voltage at the connecting point between the resistances R207 and R208, that is, the point P4 increases, the FET (T202) becomes on. This triggers the generation of the rough road mode. Namely, The negative side terminal voltage Vrr of the capacitor C13 is lowered to a GND level. This state is the state of the rough road mode. When the FET (T202) is off, the negative side terminal voltage Vrr of the capacitor C13 is raised to the supply voltage VB2 at a time constant C13*R203 of C13 and the resistance R203, and the rough road state disappears gradually.

As has been described above, in the event that the time when the voltage Vc2 does not become smaller than the reference voltage Vc is longer (in the event that the time continues over the first predetermined time), the FET (T202) becomes on, and the rough road mode is established. Namely, the determination of the fact that the load current ID has drastically decreased from the steady state is implemented.

In a state where the rough road mode has not yet been operated, since the FET (T202) remains off, the drain of the FET (T202) is raised to the supply voltage VB2 via the resistance R203. Consequently, the capacitor C13 is put in a discharged state.

Then, when the rough road mode is operated, the FET (T202) becoming on, the gate of the FET (T201) is almost grounded because the resistance R204 is extremely smaller than the resistance R203, At this time, if the comparator CMP1 outputs a low level so as to turn on the FET (T203), the charge current flows to the capacitor C11. Namely, the charge current flows from the negative terminal (the point P3) of the capacitor C1 to the capacitor C11 via the diode D102.

Since this functions to draw electric charge that has been charged in the capacitor C1, the reference voltage Vc decreases, and the difference between the voltage vins and the reference voltage Vc is expanded. Namely, the output signal of the comparator CMP1 returns to a high level from the low level and is made difficult to reverse from "H" to "L".

In addition, when the gate of the FET (T201) is grounded, while the FET (T201) which is made up of PMOS is put in an energized state, in the event that the FET (T203) is off, no drain current flows to the FET (T201), and since the terminal voltage on the lower side (the resistance R206 side) of the capacitor C11 is raised by the supply voltage VB2, the source voltage of the FET (T201) reaches VB2, and the FET (T201) is put in the on state which is saturated.

In addition, when the FET (T202) is off, as has been described above, the voltage of the terminal on the lower side of the capacitor C13 is raised by the resistance R203 and increases in an exponential function-like fashion. The time constant at this time is 91 ms. In conjunction with this, the electric charge accumulated in the capacitor C13 is discharged via a route made up of C13, D103, T21, R20, and GND in that order.

The voltage Vrr at the connecting point of the gate of the FET (T201) and the capacitor C13 is the rough road mode voltage, and (VB2−Vrr) constitutes the intensity of the rough road mode. Namely, when Vrr=0V, the state of the rough road mode is most intensive, and when Vrr=VB2, the state of the rough road disappears.

Here, assuming that the threshold voltage of the FET (T201) is Vth201, when the gate voltage of the FET (T201) resides between the ground level to (VB2−Vth201), Vins<Vc, and when the output of the comparator CMP1 becomes "L", the on/off operation of the FET (T1) is started by the driver 11 shown in FIG. 1.

In addition, since the FET (T203) becomes on, the terminal voltage on the lower side (R206 side) of the capacitor C11 decreases, and the charge current flows to the capacitor C11. Due to this, since the current is drawn from the negative terminal of the capacitor C1, the reference voltage Vc decreases, and Vins increases. As a result, the number of times of on/off is suppressed from reaching a determination value (for example, 8 times).

The terminal voltage on the lower side of the capacitor C11 can be lowered to the source voltage of the FET (T201) but cannot lower than that. Since the source voltage of the FET (T201) is a voltage which is higher by the threshold voltage Vth201 than the gate voltage thereof, the electric charge quantity that is drawn from the capacitor C1 by the capacitor C11, that is, the bucket effect is determined by the gate voltage of the FET (T201). When the gate voltage of the FET (T201) resides at the ground, the bucket effect becomes largest, and the bucket effect gets limited as the gate voltage of the FET (T201) gets higher.

Namely, when the rough road mode occurs, in the event that the voltage Vins becomes lower than the reference voltage Vc, and the output of the comparator CMP1 is reversed from "H" to "L", the bucket operation by the capacitor C11, that is, the drawing of electric charge from the capacitor C1 is started, and therefore, the reference voltage Vc decreases. As a result, the time period in a state of Vins<Vc is reduced, and Vins is recovered within the time when the on/off operation is performed. Namely, Vins>Vc is realized, and the relay RY1 is prevented from becoming off, and hence the erroneous stopping or reversing of the driving motor M1 can be prevented.

In addition, in the event that the ambient temperature is low, the load current ID becomes easy to be increased due to the friction of rubber. In this case, the difference (VB2−Vc) between the supply voltage VB2 and the reference voltage Vc is increased. Then, the FET (T204) becomes on, and since the bias current I5 flows, the gate voltage of the FET (T202) increases. Consequently, the rough road mode becomes easy to be established, and the erroneous stopping of the driving motor M1 can be prevented that would occur due to the increase in motor load at the time of low temperature.

Thus, with the power window driving apparatus according to the embodiment, at the normal time when no rough road running is performed, when the load current ID increases due to the occurrence of a seizure of an obstacle by the power window, the current Ir1 increases in association with the increase in load current ID, and the voltage Vins decreases below the reference voltage Vc. Then, the on/off operation of the FET (T1) is repeated, and in the event that the predetermined number of times of repetition is reached, the driving of the driving motor M1 is stopped or the driving direction thereof is reversed. Consequently, in the event that an obstacle is seized by the window glass, the obstacle and/or the window glass itself can be protected against damage in an ensured fashion.

In addition, while the vehicle is running on the rough road (a running path having severe ups and downs or irregularities), in the event that the power window is activated, the current Ir1 increases and decreases in a cyclic fashion, and the voltage at the point P2 increases when the current Ir1 decreases, whereby since the rough road mode is generated and the difference between the reference voltage Vc and the voltage Vins is expanded, the output signal of the comparator CMP1 is made difficult to be reversed from "H" to "L", thereby making it possible to prevent the erroneous stopping or reversing of the power window due to the rough road running.

Furthermore, while the rough road mode is occurring, in the event that the output signal of the comparator CMP1 is reversed from "H" to "L", since the reference voltage Vc is operated to decrease due to the bucket effect of the capacitor C11, even in the event that the on/off operation of the FET (T1) is repeated, the voltage Vins is allowed to exceed the reference voltage Vc immediately, and therefore, the detection of excess current can be avoided at a stage before the on/off operation of the FEt (T1) is repeated the predetermined number of times (for example, 8 times), thereby making it possible to prevent the relay RY1 from becoming off.

In addition, since the rough road mode becomes easy to be generated due to the current I5 flowing in the event that the ambient temperature is low, even in the event that the load current ID increases due to the increase in friction force, the erroneous stopping or reversing of the window glass can be prevented.

Thus, while the power window driving apparatus of the invention has been described based on the illustrated embodiment, the invention is not limited thereto and the configurations of the respective portions can be replaced with any configurations having similar functions.

The invention is extremely useful in preventing the erroneous reversing of a power window when a vehicle equipped with the power window is running on a rough road.

What is claimed is:
1. A power window driving apparatus, comprising:
a reference current generator, which generates a reference current having a level corresponding to a motor current which flows to a power window driving motor, the reference current generator including:
  a first current generator, which generates a first current having a level corresponding to a variation level of the motor current, a first comparison signal converted from the first current, and a second comparison signal also converted from the first current;
  a reference voltage generator, which generates a reference voltage signal based on a time mean value of the second comparison signal; and
  a second current generator, which generates a second current which has a level corresponding to the ref- erence voltage signal, and the second current being equal in level to the reference current when added to the first current;

a comparator, which compares the first comparison signal with the reference voltage signal;

a driving controller, which stops or reverses the driving motor when it is determined that a drastic increase is occur in the motor current based on a result of a comparison by the comparator; and a current increaser, which increases an amount of the second current for a predetermined period when the motor current is drastically decreased from a steady state, so that an increase in the first current is suppressed when the motor current is shifted from the drastically decrease to an increase.

2. The power window driving apparatus as set forth in claim 1, further comprising a determinant, which determines that the motor current is drastically decreased from a steady state when a state where the second comparison signal is equal to or greater than the reference voltage signal continues over a first predetermined time.

3. The power window driving apparatus as set forth in claim 1, wherein the current increaser includes a first capacitor;

wherein the reference voltage signal is input to one end of the first capacitor; and wherein when it is determined that the motor current is drastically decreased from a steady state, the other end of the first capacitor is grounded so that the first capacitor is charged by the reference voltage signal, whereby the reference voltage signal is decreased for a predetermined period so as to increase the second current.

4. The power window driving apparatus as set forth in claim 3, wherein when the second comparison signal becomes smaller than the reference voltage signal, the grounding of the first capacitor is released so that an electric potential on a grounded side of the first capacitor gradually increases toward a supply voltage.

5. The power window driving apparatus as set forth in claim 3, further comprising a second capacitor which has one end to which the reference voltage signal is input, wherein the grounded side electric potential of the first capacitor resides at a grounded electric potential or between the grounded electric potential and the supply voltage; and wherein when the comparator detects that the first comparison signal becomes smaller than the reference voltage signal, the other end of the second capacitor is grounded so that the the second capacitor is charged by the reference voltage signal, whereby the reference voltage signal is decreased, whereas the second current is increased, as a result of which the decrease of the first current is accelerated so that the time period when the first comparison signal remains smaller than the reference voltage signal is reduced.

6. The power window driving apparatus as set forth in claim 5, further comprising a circuit having a first semiconductor element and a second semiconductor element which are connected in series, the circuit being provided between the other end of the second capacitor and the ground, wherein the grounded side electric potential of the first capacitor is input to a control terminal of the first semiconductor element and an inverted output of the comparator is input to a control terminal of the second semiconductor element;

wherein the first semiconductor element is energized when the grounded side electric potential of the first capacitor resides at the grounded electric potential or between the grounded electric potential and the supply voltage; and wherein the second semiconductor element is energized when the first comparison signal is smaller than the reference voltage signal, whereby the other end of the second semiconductor element is grounded.

7. The power window driving apparatus as set forth in claim 5, wherein a discharging time constant of the second capacitor is set to a value that is not discharged completely when the second capacitor is repeatedly grounded within a short period of time; and wherein when the second capacitor is repeatedly grounded within the short period of time, electric charge is accumulated in the second capacitor, and charge current decreases as the number of times of repetition increases, thereby the effect of decreasing the reference voltage is reduced gradually.

8. The power window driving apparatus as set forth in claim 2, wherein when the determinant determines the drastic decrease from the steady state of the motor current, the first predetermined time is set to become shorter as the motor current becomes greater.

9. The power window driving apparatus as set forth in claim 8, further comprising a third semiconductor element being an NMOS, wherein a drain of the third semiconductor element is connected to the first capacitor, a source of the third semiconductor element is grounded, and the result of the determination that the motor current is drastically decreased from the steady state is input into a gate of the third semiconductor element as voltage; and wherein a bias voltage which increases as the motor current increases is superimposed on a gate voltage of the third semiconductor element so that the first predetermined time is set to become shorter as the motor current becomes greater.

* * * * *